United States Patent
Fortenberry

(10) Patent No.: US 6,496,296 B1
(45) Date of Patent: Dec. 17, 2002

(54) METHOD AND APPARATUS FOR ACCOMMODATING FOR WAVELENGTH DRIFT OF OPTICAL SOURCES

(75) Inventor: Rance M Fortenberry, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 1 day.

(21) Appl. No.: 09/650,832

(22) Filed: Aug. 30, 2000

(51) Int. Cl.$^7$ ................................................. G02F 1/23
(52) U.S. Cl. ...................... 359/278; 359/238; 359/239
(58) Field of Search ................................. 359/278, 238, 359/237, 189, 182, 115, 239; 250/205, 227.23, 214 P, 214.3, 214.4, 214.1

(56) References Cited

U.S. PATENT DOCUMENTS 5,526,170 A * 6/1996 Esman et al. ............... 359/279
5,930,024 A * 7/1999 Atlas .......................... 359/279

* cited by examiner

Primary Examiner—Georgia Epps
Assistant Examiner—Tuyen Tra
(74) Attorney, Agent, or Firm—John L. Imperato

(57) ABSTRACT

A method and apparatus accommodate for wavelength drift of optical sources. The apparatus includes an optical source having a wavelength control port and an output port, providing one or more optical signals that drift at a first rate. A signal generator within the apparatus provides a control signal to the wavelength control port of the optical source that causes wavelength variations to be superimposed on the wavelength drift of the one or more optical signals. The superimposed wavelength variations occur at a second rate that exceeds the first rate. The apparatus also includes a receiver coupled to the output port of the optical source, that receives the one or more optical signals having the superimposed wavelength variations. The receiver accommodates for the wavelength variations caused by the control signal, enabling a received wavelength to be distinguished from the drifting wavelength of the optical source. A corresponding method accommodates for wavelength drift of optical sources.

18 Claims, 2 Drawing Sheets

METHOD AND APPARATUS FOR ACCOMMODATING FOR WAVELENGTH DRIFT OF OPTICAL SOURCES

BACKGROUND OF THE INVENTION

Optical sources are included in a variety of optical measurement and communication systems. However, many types of optical sources experience wavelength drift, induced by changes in temperature, pressure or other operating conditions, that impairs the performance of the systems in which the optical sources are included. Wavelength drift also causes undesired variations in power-weighted wavelength of the optical source, especially when the optical source provides optical signals that are widely spaced relative to the gain profile of the optical source.

Known techniques apply either a feedback signal or a correction signal to a wavelength modulation port of an optical source in order to reduce wavelength drift. In one technique, a feedback signal applied to the wavelength modulation port cancels wavelength drift and maintains a constant power-weighted wavelength at the output of the optical source. Generating the feedback signal relies on optical detectors and feedback circuitry, which increases the manufacturing cost of the optical source. Another technique reduces wavelength drift by applying a correction signal to the wavelength modulation port of the optical source to approximately cancel wavelength drift and reduce the variations in power-weighted wavelength of the optical source. Establishing the correction signal involves characterizing the wavelength drift of the optical source according to temperature, pressure and other operating conditions of the optical source, which is time-consuming.

SUMMARY OF THE INVENTION

A method and apparatus constructed according to the preferred embodiments of the present invention accommodate for wavelength drift of an optical source without the disadvantages associated with applying either a feedback signal or a pre-established correction signal to the optical source. The apparatus includes an optical source having a wavelength control port and an output port providing one or more optical signals. The one or more optical signals has a wavelength that drifts at a first rate. A signal generator within the apparatus provides a control signal to the wavelength control port of the optical source that causes wavelength variations to be superimposed on the wavelength drift of the one or more optical signals. The superimposed wavelength variations occur at a second rate that exceeds the first rate. The apparatus also includes a receiver coupled to the output port of the optical source, that receives the one or more optical signals having the superimposed wavelength variations. The receiver accommodates for the wavelength variations caused by the control signal, enabling a received wavelength to be distinguished from the drifting wavelength of the optical source.

According to a first preferred embodiment of the present invention, the superimposed wavelength variations within the apparatus are distributed over a wavelength range so that the wavelength variations caused by the control signal have a predefined average wavelength. According to a second preferred embodiment of the present invention, the superimposed wavelength variations within the apparatus follow a predefined contour. The preferred embodiments of the present invention are alternatively implemented in a corresponding method for accommodating for wavelength drift of optical sources.

DETAILED DESCRIPTION OF THE PREFERRED EMBODIMENT

Figure 1:
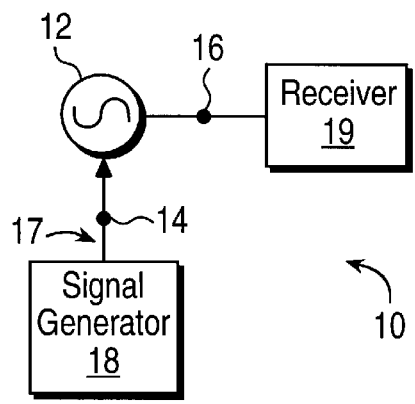
FIG. 1 shows an apparatus constructed according to the preferred embodiments of the present invention.

FIG. 1 shows an apparatus 10 for accommodating for wavelength drift of an optical source 12, constructed according to the preferred embodiments of the present invention. The apparatus 10 includes the optical source 12 having a wavelength control port 14. Typically, the optical source 12 is a semiconductor laser, light emitting diode (LED), or gas-based laser. The wavelength control port 14 enables the wavelength of the optical source 12 to be modulated. A variety of waveform modulation mechanisms within optical sources 12 are exploited to modulate the wavelength of the optical source 12. As examples, wavelength is modulated thermally, mechanically, electro-mechanically, piezoelectrically. Alternatively, wavelength is modulated by controlling pressure or other environmental conditions that influence the wavelength of the optical source 12.

Figure 2A:
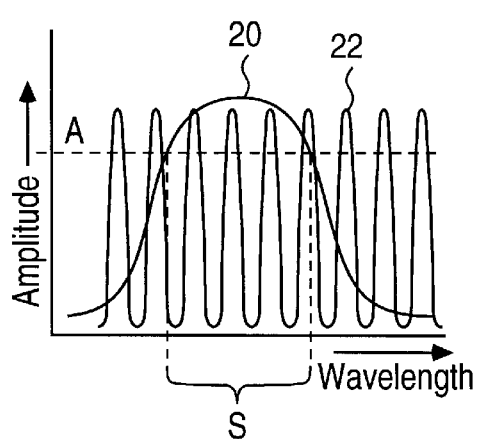
FIGS. 2A and 2B show gain profiles and optical signals for an optical source included in the apparatus of FIG. 1.
Figure 2B:
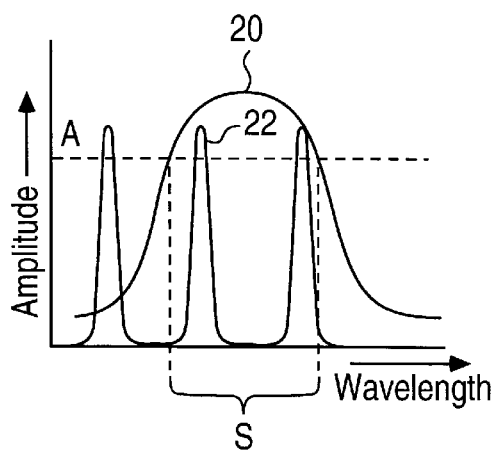

The optical source 12 has a gain profile 20 within which one or more optical signals 22 are provided. FIGS. 2A and 2B are examples of gain profiles 20 and optical signals 22 of the optical source 12. The one or more optical signals 22 within the gain profile 20 are present at an output port 16 of the optical source 12. The gain profile 20 includes a wavelength segment S over which the optical gain exceeds a predefined magnitude A. Due to changes in temperature, pressure, aging and other operating conditions of the optical source 12, the wavelength of the optical signals 22 drifts over time. The wavelength drift of the optical signals 22 has a slow rate, typically occurring over many seconds, minutes or longer time periods. The rate of wavelength drift of the one or more optical signals 22 is uniform, or the rate of wavelength drift varies over time.

In the apparatus 10 of FIG. 1, a signal generator 18 provides a control signal 17 to the wavelength control port 14 of the optical source 12 that causes wavelength variations to be superimposed on the wavelength drift of the optical signals 22. The rate of the superimposed wavelength variations exceeds the wavelength drift rate of the optical source 12. The wavelength range R (shown in FIG. 3 and FIG. 4) over which the wavelength variations are superimposed is typically within the wavelength segment S of the gain profile 20 of the optical source 12 to achieve high available output power from the optical source 12. Alternatively, the wavelength range R over which wavelength variations are superimposed is designated to be greater than the wavelength segment S of the gain profile 20.

In the apparatus 10 of FIG. 1, a receiver 19 coupled to the output port 16 of the optical source 12, receives the optical signals 22 having the superimposed wavelength variations and accommodates for these wavelength variations provided by the control signal 17. The receiver 19 is a wavelength meter, optical signal analyzer or other type of optical measurement or communication system.

Figure 3:
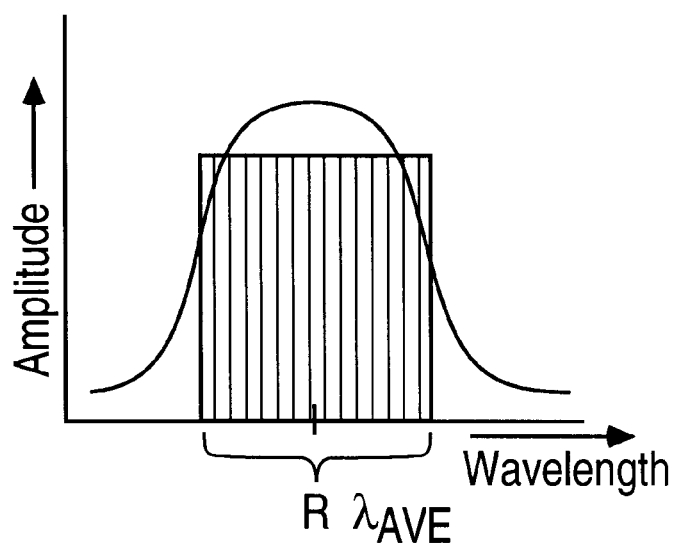
FIG. 3 is a detailed view of a first superimposed wavelength variation within the apparatus of FIG. 1, constructed according to a first preferred embodiment of the present invention.

According to a first preferred embodiment of the present invention, the control signal 17 provided by the signal generator 18 superimposes wavelength variations on the drifting optical signals 22 that have a predefined average wavelength $\lambda_{AVE}$ and are randomly, pseudo-randomly, or uniformly distributed. Alternatively, the superimposed wavelength variations have a predefined average wavelength and are arbitrarily distributed. FIG. 3 is an example of the superimposed wavelength variation included in the first preferred embodiment of the present invention. In this example, the superimposed wavelength variation is uniformly distributed over a wavelength range R and has the average wavelength $\lambda_{AVE}$. Signal generators 18 that include a spectrally-shaped noise source or arbitrary function generators are well-suited for providing the control signal 17 that causes superimposed wavelength variations that have a predefined average wavelength $\lambda_{AVE}$. The receiver 19 accommodates for superimposed wavelength variations caused by the control signal 17 in this preferred embodiment by averaging the wavelengths of the optical signals 22 received from the optical source 12. On the basis of the predefined average wavelength $\lambda_{AVE}$ of the superimposed wavelength variations resulting from the averaging by the receiver 19, a received wavelength equal to the average wavelength $\lambda_{AVE}$ is distinguished from the drifting wavelength of the optical source 12.

Figure 4:
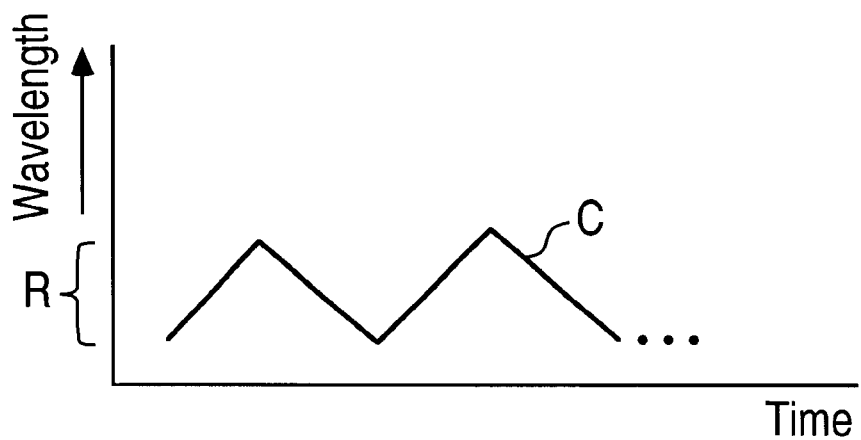
FIG. 4 is a detailed view of a second superimposed wavelength variation within the apparatus of FIG. 1, constructed according to a second preferred embodiment of the present invention.

According to a second preferred embodiment of the present invention, the control signal 17 provided by the signal generator 18 superimposes a wavelength variation on the drifting one or more optical signals 22 that follows a predefined contour C. FIG. 4 is an example of the superimposed wavelength variation included in the second preferred embodiment of the present invention. In this example, the superimposed wavelength variation has a predefined contour C that includes a series of increasing linear segments and a series of decreasing linear segments. Signal generators 18 such as sawtooth, sine, ramp and other function generators, are well-suited for providing the control signal 17 to cause wavelength variations in the optical signals 22 that have alternative predefined contours C. The receiver 19 accommodates for wavelength variations in this preferred embodiment by synchronizing measurements or observation periods occurring within the receiver 19 with the predefined contour C of the superimposed wavelength variations. The synchronization includes coordinating measurements or observation periods of the receiver 19 in a predesignated relationship to the predefined contour C of the superimposed wavelength variations. On the basis of the predefined contour C, a received wavelength established by the predesignated relationship to the contour C, is distinguished from the drifting wavelength of the optical source 12.

The preferred embodiments of the present invention are alternatively implemented using a corresponding method for accommodating for wavelength drift of an optical source 12. The method includes superimposing wavelength variations on one or more optical signals 22 having wavelengths drifting at a first rate within a gain profile 20 of the optical source 12. The superimposed wavelength variations result in deviations in the wavelength of the one or more optical signals 22 at a second rate that exceeds the first rate. The method then includes receiving the one or more optical signals 22 having the superimposed wavelength variations and accommodating for the superimposed wavelength variations to distinguish a received wavelength of the one or more optical signals 22 from the drifting wavelength of the optical source 12. When the superimposed wavelength variations have a predefined average wavelength $\lambda_{AVE}$ and are uniformly, randomly, pseudo-randomly or arbitrarily distributed, accommodating for the superimposed wavelength variations includes averaging the wavelength variations, causing the received wavelength to equal the average wavelength $\lambda_{AVE}$. When the superimposed wavelength variations follow a predefined contour C, accommodating for the superimposed wavelength variations includes synchronizing the receiving of the one or more optical signals 22 to the predefined contour C, causing the received wavelength to have a predesignated relationship to the predefined contour C.

While the preferred embodiments of the present invention have been illustrated in detail, it should be apparent that modifications and adaptations to these embodiments may occur to one skilled in the art without departing from the scope of the present invention as set forth in the following claims.

What is claimed is:

1. An apparatus, comprising:
   an optical source having a control port, a gain profile and an output port providing at least one optical signal within the gain profile, the at least one optical signal having a wavelength drifting at a first rate;
   a signal generator providing a control signal to the control port of the optical source that superimposes wavelength variations in the at least one optical signal over a predefined wavelength range at a second rate exceeding the first rate; and
   a receiver coupled to the output port of the optical source receiving the at least one optical signal having the superimposed wavelength variations, the receiver accommodating for the wavelength variations provided by the control signal to distinguish a received wavelength of the at least one optical signal from the wavelength drifting at the first rate.

2. The optical system of claim 1 wherein the superimposed wavelength variations provided by the control signal have a predefined average wavelength and the received wavelength is equal to the predefined average wavelength.

3. The optical system of claim 2 wherein the superimposed wavelength variations have one of a uniform distribution, a random distribution and a pseudo-random distribution.

4. The optical system of claim 2 wherein accommodating for the wavelength variations provided by the control signal includes averaging the wavelength of the at least one optical signal having the superimposed wavelength variations.

5. The optical system of claim 3 wherein accommodating for the wavelength variations provided by the control signal includes averaging the wavelength of the at least one optical signal having the superimposed wavelength variations.

6. The optical system of claim 1 wherein the superimposed wavelength variations provided by the control signal follow a predefined contour.

7. The optical system of claim 6 wherein the predefined contour includes an increasing linear segment and a decreasing linear segment.

8. The optical system of claim 6 wherein accommodating for the wavelength variations provided by the control signal includes synchronizing the receiver to the predefined contour.

9. The optical system of claim 7 wherein accommodating for the wavelength variations provided by the control signal includes synchronizing the receiver to the predefined contour.

10. A method, comprising:

superimposing wavelength variations on at least one optical signal having a wavelength drifting at a first rate and within a gain profile of an optical source, the superimposed wavelength variations causing deviations in the wavelength of the at least one optical signal at a second rate exceeding the first rate; and receiving the at least one optical signal having the superimposed wavelength variations and accommodating for the superimposed wavelength variations to distinguish a received wavelength of the at least one optical signal from the wavelength drifting at the first rate.

11. The method of claim 10 wherein the superimposed wavelength variations have a predefined average wavelength and the received wavelength is equal to the predefined average wavelength.

12. The method of claim 11 wherein the superimposed variations have one of a uniform distribution, a random distribution and a pseudo-random distribution.

13. The method of claim 12 wherein accommodating for the wavelength variations includes averaging the wavelength of the at least one optical signal having the superimposed wavelength variations.

14. The method of claim 11 wherein accommodating for the wavelength variations provided by the control signal includes averaging the wavelength of the at least one optical signal having the superimposed wavelength variations.

15. The method of claim 10 wherein the superimposed wavelength variations follow a predefined contour and the received wavelength is established by the predefined contour.

16. The method of claim 15 wherein the predefined contour includes an increasing linear segment and a decreasing linear segment.

17. The method of claim 16 wherein accommodating for the wavelength variations includes synchronizing the receiver to the predefined contour.

18. The method of claim 15 wherein accommodating for the wavelength variations includes synchronizing the receiver to the predefined contour.

* * * * *